(12) United States Patent
Szocs

(10) Patent No.: US 9,372,683 B2
(45) Date of Patent: Jun. 21, 2016

(54) AUTOMATIC GENERATION OF CLASS IDENTIFIERS FROM SOURCE CODE ANNOTATIONS

(75) Inventor: Vojtech Szocs, Bratislava (SK)

(73) Assignee: Red Hat Israel, Ltd., Raanana (IL)

( * ) Notice: Subject to any disclaimer, the term of this patent is extended or adjusted under 35 U.S.C. 154(b) by 730 days.

(21) Appl. No.: 13/603,954

(22) Filed: Sep. 5, 2012

(65) Prior Publication Data

US 2014/0068559 A1    Mar. 6, 2014

(51) Int. Cl.
  *G06F 9/44*  (2006.01)
  *G06F 9/45*  (2006.01)
  *G06F 11/36*  (2006.01)

(52) U.S. Cl.
  CPC .. *G06F 8/70* (2013.01); *G06F 8/38* (2013.01); *G06F 8/41* (2013.01); *G06F 11/36* (2013.01); *G06F 11/3624* (2013.01)

(58) Field of Classification Search
  None
  See application file for complete search history.

(56) References Cited

U.S. PATENT DOCUMENTS 6,360,358 B1 *  3/2002  Elsbree et al. ............... 717/120
2008/0235661 A1 *  9/2008  Arpana et al. ............... 717/116

* cited by examiner

*Primary Examiner* — Lewis A Bullock, Jr.
*Assistant Examiner* — Mark Gooray
(74) *Attorney, Agent, or Firm* — Lowenstein Sandler LLP

(57) ABSTRACT

A method for generating identifiers for software components is provided. A processing device scans source code for an annotation associated with generating an identifier for an object. The processing device generates, using the annotation, an identifier value for the object. When the object does not have a previously assigned value, the processing device assigns the identifier value to the object. When the object has a previously assigned value, the processing device concatenates the identifier value to the previously assigned value of the object and assigns the concatenated identifier value to the object. The processing device then recursively descends into the sub-object's hierarchy by repeating the steps of scanning, generating, and assigning or concatenating and assigning described above.

13 Claims, 9 Drawing Sheets

```
                          public class LoginView {          ←——————— 100
102  ——————▶  // Visual components
              private TextBox userNameTextBox;
              private Button loginButton;

104  ——————▶  // Constructor
              public LoginView() {
                  // Visual component initialization omitted 106  ——————▶  // Assign ID values to visual components
              userNameTextBox.setId("userName");
              LoginButton.setId("loginButton");
                  }
              }
```

Figure 1 (related art)

```
                                        ← 602 public class LoginView {        ← 604
                                ← 606
    @WithElementId("userName")
    private TextBox userNameTextBox;
                                          ← 608
    @WithElementId // Default ID value = field name
    private Button loginButton;

// Constructor    ← 610
    public LoginView() {

// Visual component initialization omitted
    // "IdHandler" represents the logic behind generating
    // and setting IDs
    IdHandler.generateAndSetIds(this);
    }                              ← 612
}
```

FIGURE 6

```
                                            702
                                          ←
public class LoginView {

@WithElementId("inputForm")     ←——— 704
        private LoginInputForm form;    ←——— 706

@WithElementId
        private Button loginButton;     ←——— 708

// Constructor              ←——— 710
        public LoginView() {
                // Visual component initialization omitted
                IdHandler.generateAndSetIds(this);   ←——— 714
        }
}
```

FIGURE 7

```
                                                    800
                                                   ↙ public class LoginInputForm {    ←—— 802

@WithElementId("userName")
                private TextBox userNameTextBox;   ←—— 804

806
                @WithElementId("password")   ←——
                private PasswordTextBox passwordTextBox;

// No special code here – IdHandler gets
                // invoked on main (LoginView) component
        }
                                                    808
                                              ←———
• LoginView → form = LoginView_inputForm
• LoginView → form → userNameTextBox = LoginView_inputForm_userName
• LoginView → form → passwordTextBox = LoginView_inputForm_password
• LoginView → loginButton = LoginView_loginButton
```

FIGURE 8

AUTOMATIC GENERATION OF CLASS IDENTIFIERS FROM SOURCE CODE ANNOTATIONS

TECHNICAL FIELD

Embodiments of the present invention relate to computer programming tools, and more specifically, to a method and system for generating identifiers for software components.

BACKGROUND

In many environments where humans need to view, comprehend, and remember software parameters, variables, and other identifiers, it is generally preferable that the identifiers be mnemonic. One such environment is functional testing of computer software through its user interface. Exposing the user interface of software as a Web application is a common practice employed in software computing. As most Web applications have graphical user interfaces (GUI), functional testing of Web applications typically involves interaction with GUI components in an automated way.

Automated functional testing of Web applications using Web-based GUIs generally simulates user interaction by controlling a Web browser. A simple GUI test may include features such as (1) opening the main page of a Web application under test; (2) filling in forms or input fields, clicking buttons, etc.; and (3) asserting one or more expected outputs by examining the Web application's HTML page structure (e.g., by asserting that certain text or a component is present on the Web page after performing actions in the previous step).

In order to render Web applications accessible to automated GUI testing tools, each important visual component (input field, button, etc.) needs to have a unique and deterministic identifier (ID) assigned: (1) unique in the sense that each ID corresponds to one (and only one) component and (2) deterministic in the sense that an ID is completely determined by the state of the component (i.e., the ID value does not depend on the order of creation of individual components).

However, making a Web application accessible to automated GUI testing tools requires additional effort during its development. Oftentimes, Web application developers assign IDs to visual components manually (i.e., using statically-assigned ID values, which are either completely or partially hand-crafted). Such IDs might not be unique and deterministic across all visual components, resulting in failure (i.e. non-unique) or inexactness (i.e., non-deterministic) of relevant GUI tests.

This is due in part to an often tedious way in which each visual component in a GUI functional test requires at least one corresponding human-readable identifier to be set.

FIG. 1 shows an example of a code segment for manually assigning ID values to visual components (using regular Java code) in the related art. The code segment comprises a class definition 100 having two visual components 102. A constructor 104 of the class 100 is employed to individually call a "setId" method for each specific visual component. However, this manual method for setting identifiers may be prone to duplication when a child class is coded to override the default ID naming scheme.

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which:

FIG. 1 shows an example of a code segment for manually assigning ID values to visual components (using regular Java code) in the related art.

FIG. 6 depicts a code segment of one embodiment of Java source code that includes annotations that automatically generate identifiers for software components.

FIG. 7 depicts a code segment of one embodiment of Java source code that includes annotations that automatically generate identifiers for software components, where the software component is a more complex compound component (e.g., a data structure, class, interface, etc.).

FIG. 8 depicts a code segment of one embodiment of Java source code that includes nested annotations that automatically generate identifiers for software components, where the software component is the more complex compound component of FIG. 7.

DETAILED DESCRIPTION

Figure 2:
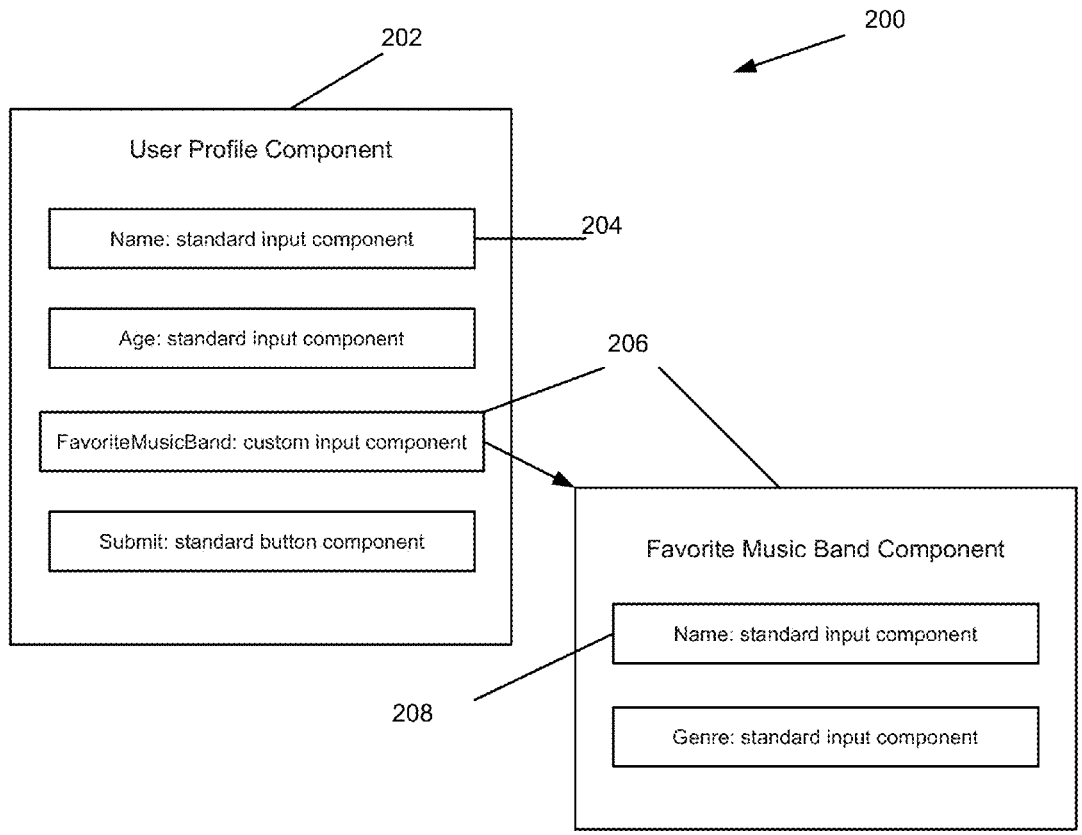
FIG. 2 depicts one embodiment of a software component naming scheme that is human readable and permits software developers to implement custom ID assignment strategy.

A method and system for generating identifiers for software components are described herein. In one embodiment, an identification handler module on a processing device scans source code for an annotation associated with generating an identifier for an object. The identification handler module generates, using the annotation, an identifier value for the object. When the object does not have a previously assigned value, the identification handler module assigns the identifier value to the object. When the object has a previously assigned value, the identification handler module concatenates the identifier value to the previously assigned value of the object and assigns the concatenated identifier value to the object. In one embodiment, the concatenated value may be represented by at least two strings separated by an underscore character.

The object may be a class, a class method, an interface, a variable, a parameter, or a package. In one embodiment, the object may be associated with a visual component. The visual component may be, for example, a standard visual component, such as a button or a window, or a user specified (i.e., custom) component.

In one embodiment, the annotation may be a Java annotation specific to naming Java objects. The annotation may be operable to assign an element value associated with the name of the object.

In one embodiment, for each sub-object of the given object, the identification handler module recursively descends into the sub-object's hierarchy by repeating the steps of scanning, generating, and assigning or concatenating and assigning described above. The steps of scanning, generating, and assigning or concatenating and assigning may generate additional code for compilation by a Java compiler to produce Java bytecode with generated identifiers to be stored in a repository in the form of executable code.

Embodiments of the present invention that provide for generating identifiers for software components have several advantages over the related art. In one embodiment, the identification handler module may keep track of the identifier value assigned to the object to assure that assignments of identifier values are unique and deterministic. The identification handler module may be configured to report an error when duplicate IDs are detected (this may happen when the default ID naming scheme is overridden).

In one embodiment, the identification handler module is configured to integrate with the Google Web Toolkit (GWT) visual component abstraction (widget and DOM element API) and may function as a separate (reusable) GWT module. The identification handler module permits software developers to implement their own (custom) ID assignment strategy (typically used for custom visual components). The identification handler module permits the generation of hierarchical ID values which reflect a visual component hierarchy.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "receiving," "monitoring," "causing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be constructed for the specific purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct an apparatus to perform the method steps. The structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Embodiments of the present invention provide a method and system for generating identifiers for software components. FIG. 2 depicts one embodiment of a software component naming scheme 200 that is human readable and permits software developers to implement their own (custom) ID assignment strategy. This can be used in functional testing involving testing of customized visual components. The naming scheme 200 begins with a top level component 202 (e.g., "User Profile"), which includes a number of elements 204 that indicate GUI components such as a name, age, and submit input button. A functional test may include a custom visual component 206 (e.g. "FavoriteMusicBand"), which is itself comprised of several components 208 (e.g., name and genre). Code for generating these identifiers may begin at the highest level component 202 and may descend into the identifiers 208 associated with the custom component 206. One embodiment of a naming scheme may generate and assign values to the IDs depicted in reference 210 (e.g., UserProfileComponent_name, UserProfileComponent_favoriteMusicBand_genre, etc.).

This naming scheme comprises a mnemonic highest level component identifier name concatenated with the name of a sub-component and separated by an underscore. The hierarchy may descent to deeper levels with similar concatenations of two strings separated by an underscore character. It should be noted that other string separators and component naming schemes are possible, including, but not limited to, replacing the underscore with other symbols, providing names with initial, intermediate, or end capitals or lower case characters, no concatenation symbol, etc.

Figure 3:
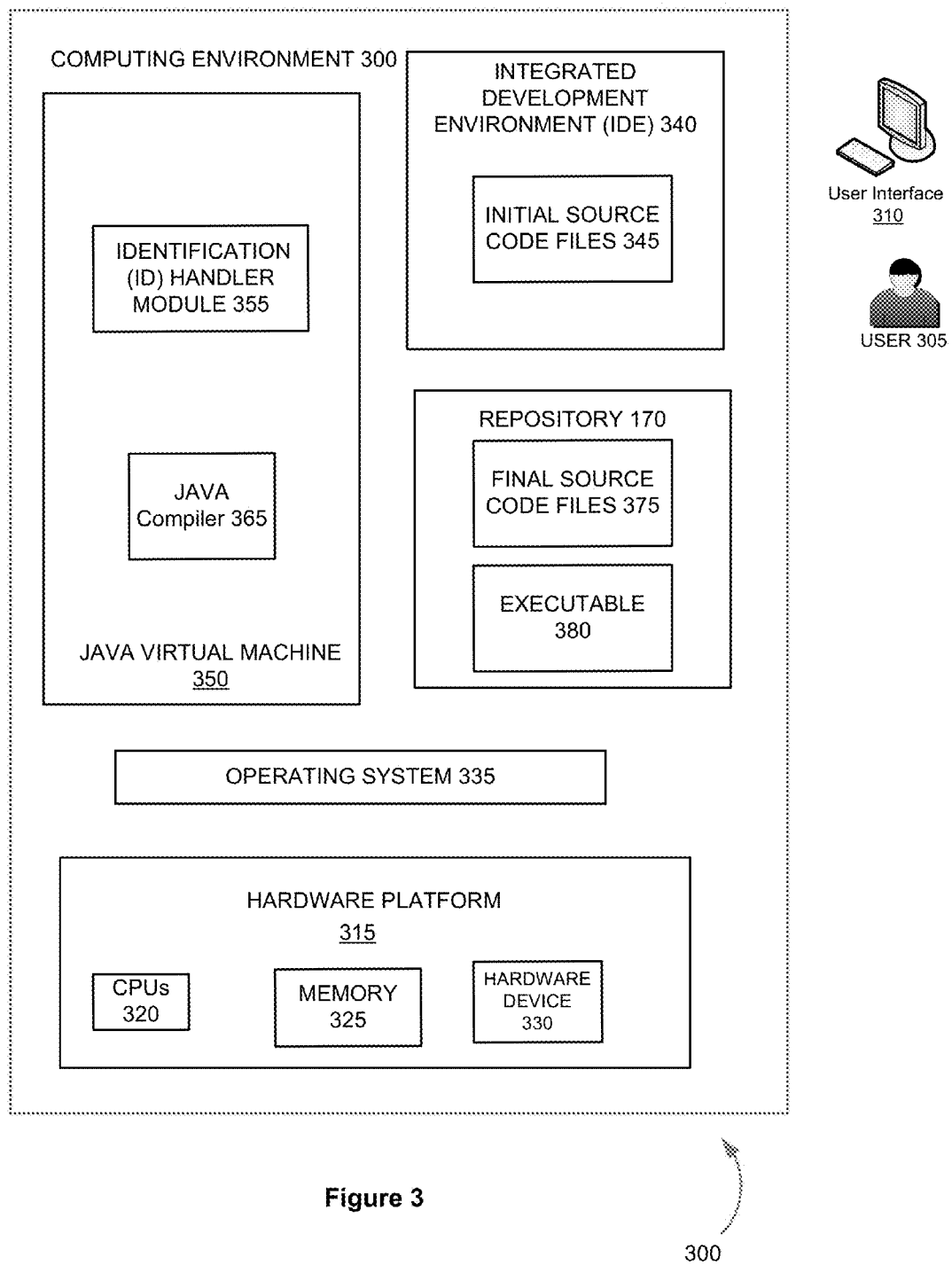
FIG. 3 illustrates one embodiment of a computing environment for generating identifiers for software component in which embodiments of the present invention may be implemented.

FIG. 3 illustrates one embodiment of a computing environment 300 for generating identifiers for software components in which embodiments of the present invention may be implemented. The computing environment 300 may be implemented on a hardware platform 315 as a server, client, workstation, desktop, tablet, or any other machine. It can also be implemented in one or more small portable platforms such as a notebook, a PDA (personal digital assistant), or wireless web devices, and other devices. The hardware platform 315 may include one or more central processing units (CPUs) 320. The hardware platform 315 may also include additional hardware devices 330, such as network interface cards (NICs), sound or video adaptors, photo/video cameras, printer devices, keyboards, displays or any other suitable device intended to be coupled to a computer system. The hardware platform 315 may also include a memory 325. In one embodiment, the memory 325 comprises one or more hardware and software devices, which may be located internally and externally to the computing environment 300. Examples of memory 325 may include, but are not limited to, random-access memory (RAM), non-volatile storage memory (e.g., Flash, EEPROM, solid state drives (SSD), etc.), magnetic storage memory (e.g., one or more hard drives), and optical memory (e.g., CDs, DVD, BlueRay drives, etc.).

The hardware platform may host an operating system 335, such Microsoft Windows®, Linux®, Solaris®, Mac® OS, etc., that provides services between the underlying hardware platform 315 and a user interface 310, an integrated development environment (IDE) 340, a Java virtual machine 350, and a repository 170.

Figure 4:
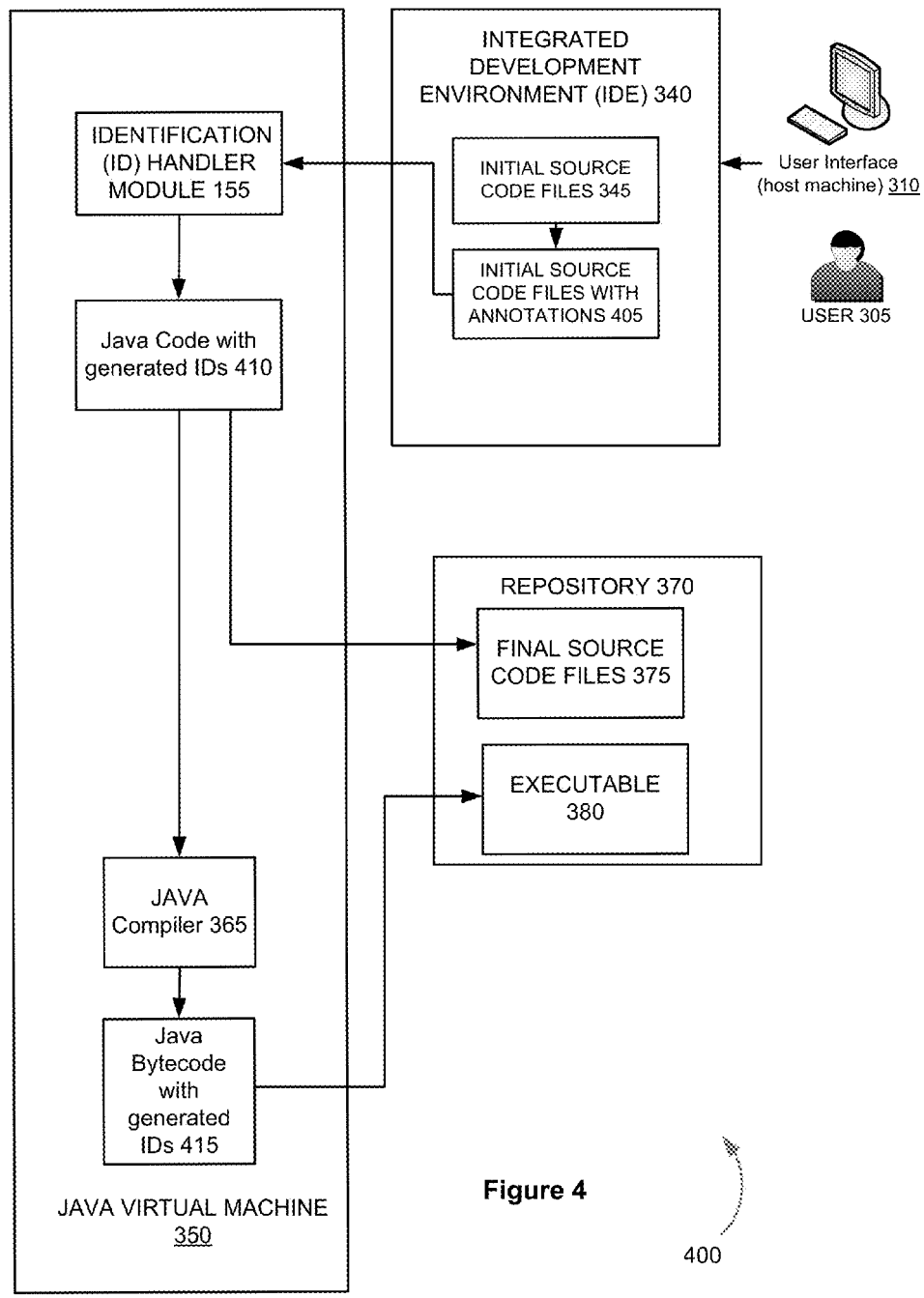
FIG. 4 is a block diagram illustrating the creation of executable code that includes annotations that generate identifiers for software components.

FIG. 4 is a block diagram illustrating the creation of executable code 380 that includes annotations that generate identifiers for software components. A user 305 (e.g., a software developer) working with the IDE 340 creates a plurality of initial source code files 345 through an editor (not shown) displayed in the user interface 310. The initial source code files 345 define tasks in the form of logic to be performed and data defining a plurality of identifiers for each task in the form of classes, class methods, interfaces, variables, parameters, and packages. The IDE 340 includes programming tools for programming in Java, C++, Perl, Python, etc. The initial source code files 345 may include one or more annotations (e.g., Java annotations) that indicate that subsequent components are to have identifiers automatically assigned to them. In one embodiment, the assigned identifiers are mnemonic (i.e., easily understandable by the user 305).

In the embodiment shown in FIGS. 3 and 4, the initial source code files with annotations 405 may be programmed, for example, in Java and fed to a Java virtual machine 350. The Java virtual machine 350 may include an identification (ID) handler module 355 and a Java compiler 365. Before compiling the initial source code files with annotations 405, the latter are pre-processed by an identification (ID) handler module 355 that generates code (e.g., Java code) with generated identifiers 410 for software components based on the included annotations. Annotation in Java source code can be used as a special form of syntactic metadata that can be added to Java source code. Java classes, methods, variables, parameters and packages may be annotated. When compiled, the Java compiler 365 conditionally stores annotation metadata in class files if the annotation has a retention policy of CLASS or RUNTIME. At runtime, the Java Virtual Machine (JVM) 350 can look for the annotation metadata to determine how to interact with various program elements or to change their behavior.

The Java compiler 365 converts the initial source code files with annotations 405 into operable information in the form of Java bytecode with generated identifiers 415. The operable information may be an executable file 380. The Java virtual machine 350 may be coupled to a repository 370 for storing the logic (e.g., the Java code with generated identifiers 410) and the operable information (e.g., the Java bytecode with generated identifiers 415 stored as an executable file 380). The repository 370 may be implemented in the memory 325 or transmitted to a remote memory (not shown) over a network (not shown) via the hardware device(s) 330 by the one or more CPUs 320.

Figure 5:
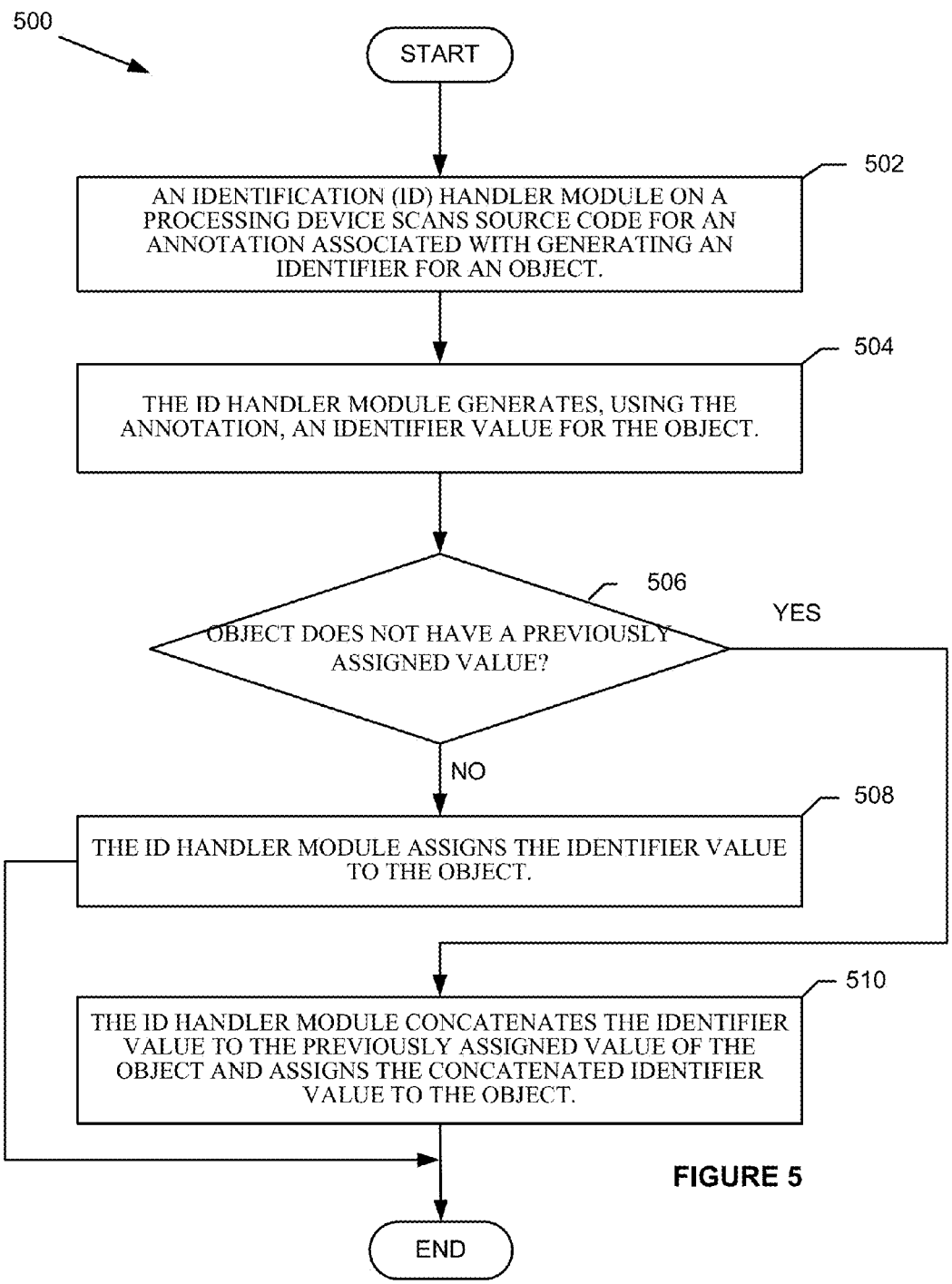
FIG. 5 is a flow diagram illustrating of one embodiment of a method for generating identifiers for software components.

FIG. 5 is a flow diagram illustrating of one embodiment of a method 500 for generating identifiers for software components. Method 500 may be performed by processing logic (e.g., in computer system 900 of FIG. 9) that may comprise hardware (e.g., circuitry, dedicated logic, programmable logic, microcode, etc.), software (such as instructions run on a processing device), firmware, or a combination thereof. In one embodiment, method 500 is performed primarily by the identification (ID) handler module 355 residing within the Java virtual machine 350 and running on the operating system 335 of the computing environment 300 of FIGS. 3 and 4.

Referring to FIG. 5, in one embodiment, method 500 begins when, at block 502, the ID handler module 355 scans source code (e.g., the initial source code files with annotations 405) for an annotation associated with generating an identifier for an object. In one embodiment, the object may be a Java object. As such, the object may be a class, a class method, an interface, a variable, a parameter, or a package. In one embodiment, the object may be associated with a visual component. The visual component may be, for example, a standard visual component, such as a button or a window, or a user specified (i.e., custom) component.

In one embodiment, the annotation may be a Java annotation specific to naming objects. The annotation may be operable to assign an element value associated with the name of the object.

At block 504, the ID handler module 355 generates, using the annotation, an identifier value for the object. In one embodiment, the identifier value assigned to the object may be based on a name of the object.

At block 506, if the ID handler module 355 has not yet a value to the object, then at block 508, the ID handler module 355 assigns the identifier value to the object.

If, at block 506, the ID handler module 355 had previously assigned a value to the object, then at block 508, the ID handler module 355 concatenates the identifier value to the previously assigned value of the object and assigns the concatenated identifier value to the object. In one embodiment, the concatenated value may be represented by at least two strings separated by an underscore character.

In one embodiment, for each sub-object (field) of the object, the ID handler module 355 recursively descends into the sub-object's hierarchy by repeating the steps of scanning, generating, and assigning or concatenating and assigning described above. The steps of scanning, generating, and assigning or concatenating and assigning may generate additional code for compilation by the Java compiler 365 to produce Java bytecode with generated identifiers 415 to be stored in the repository in the form of executable code 380.

In one embodiment, the ID handler module 355 may be operable to keep track of the identifier value assigned to the object to assure that assignments of identifier values are unique. This may be accomplished by keeping track of a root class associated with the generated identifier value. If duplicate identifier values are found, then the ID handler module 355 may set a flag or generate an error message indicating a duplicate ID failure either in the output of the ID handler module 355 or cause a compilation error in the output of the Java compiler 365.

FIG. 6 depicts a code segment 600 of one embodiment of Java source code that includes annotations that automatically generate identifiers for software components. The code segment 600 comprises a class definition 602 having two software (e.g., visual) components 606 ("userNameTextBox")

and 608 ("loginButton"). Each of the two software components 606, 608 is preceded by a Java-type annotation 604 (e.g., "@WithElementId" as indicated with the "@" symbol) that indicates to the ID handler module 355 that an identifier is to be generated for an object specified by the two software components 606, 608. If an element identifier is specified in the annotation (e.g., "userName"), then that element identifier is explicitly assigned to the software component (e.g., the software component 606). If no element identifier is specified in the annotation (i.e., the second example for "loginButton"), then the field name of the object is assigned by default (i.e., "loginButton"). Note that software component initialization is omitted in the class constructor 610. Instead, the class constructor 610 (e.g., "LoginView( )") invokes a method 612 of the ID handler module 355 with the invoking class 602 self-reference passed as a parameter (e.g., IdHandler.generateAndSetIds(this)").

FIG. 7 depicts a code segment 700 of one embodiment of Java source code that includes annotations that automatically generate identifiers for software components, where the software component is a more complex compound component (e.g., a data structure, class, interface, etc.). The code segment 700 comprises a "main" component 702 ("LoginView") and a sub-component 706 ("LoginInputForm form"). The sub-component 706 is explicitly assigned an element identifier with the annotation 704 (i.e., "inputForm"). A second sub-component 708 (i.e., "loginButton") is implicitly assigned an element identifier corresponding to the name of the component (i.e., "loginButton"). The class constructor 710 (e.g., "LoginView( )") invokes a method 710 of the ID handler module 355 with the invoking class self-reference as an parameter (i.e., IdHandler.generateAndSetIds(this)").

FIG. 8 depicts a code segment 800 of one embodiment of Java source code that includes nested annotations that automatically generate identifiers for software components, where the software component is the more complex compound component 706 of FIG. 7 (i.e., "LoginInputForm form"). The code segment 800 comprises a class definition 802 (e.g., "LoginInputForm") of the sub-component 706 that comprises two sub-sub-components 804 ("userNameTextBox") and 806 ("passwordTextBox"). The class constructor (not shown) need not explicitly call method 710 (e.g., IdHandler.generateAndSetIds(this)") since the ID handler module 355 invoked in the parent class automatically "knows" to descend recursively into child classes of the parent class. The resulting names assigned by ID handler module 355 are indicated at reference 808.

Figure 9:
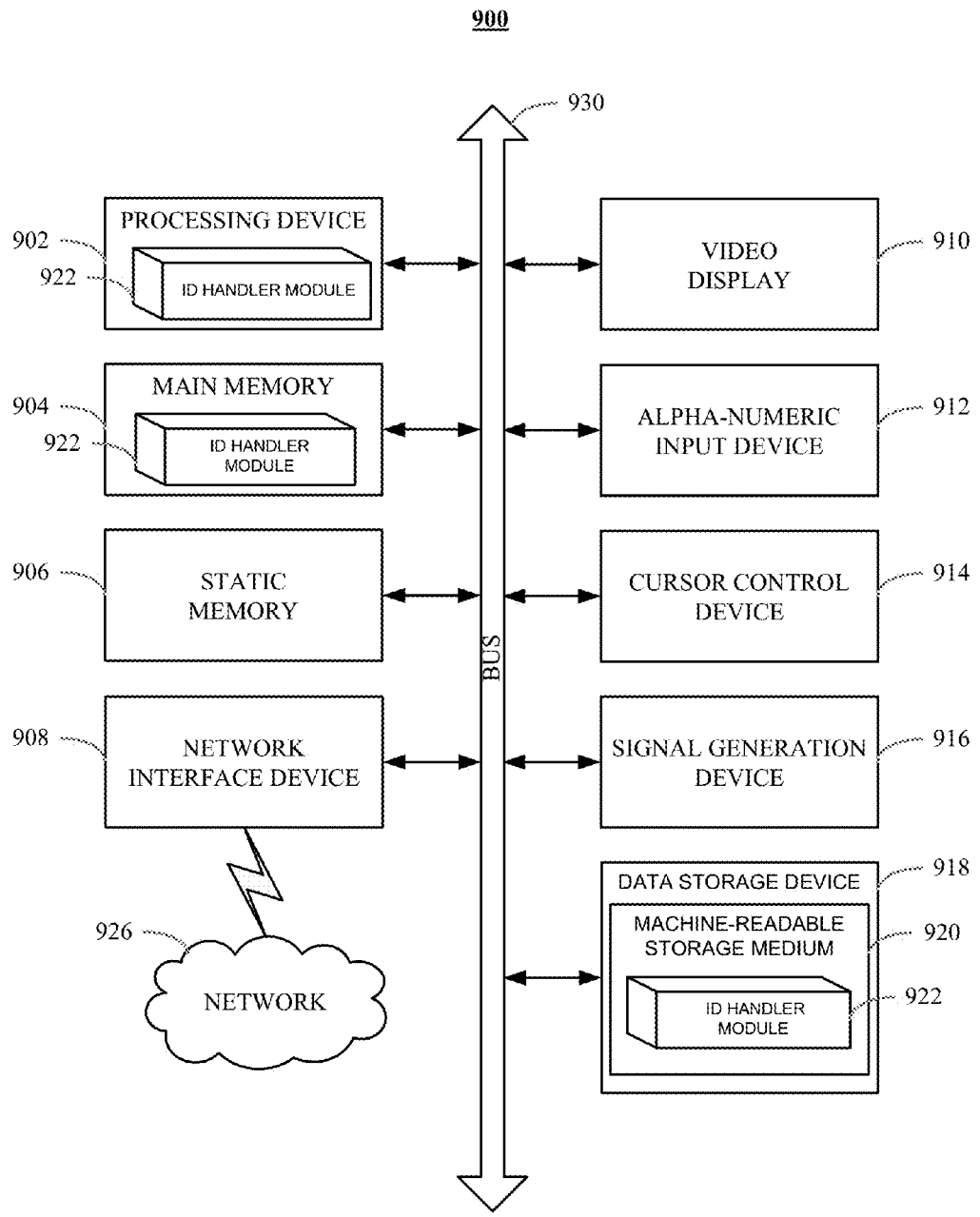
FIG. 9 illustrates a diagrammatic representation of a machine in the exemplary form of a computer system within which a set of instructions, for causing the machine to perform any one or more of the methodologies discussed herein, may be executed.

FIG. 9 illustrates a diagrammatic representation of a machine in the exemplary form of a computer system 900 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing device 902, a main memory 904 (e.g., read-only memory (ROM), flash memory, dynamic random access memory (DRAM) (such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. Processing device 902 is configured to execute the ID handler module 355 for performing the operations and steps discussed herein.

Computer system 900 may further include a network interface device 908. Computer system 900 also may include a video display unit 910 (e.g., a liquid crystal display (LCD) or a cathode ray tube (CRT)), an alphanumeric input device 912 (e.g., a keyboard), a cursor control device 714 (e.g., a mouse), and a signal generation device 916 (e.g., a speaker).

Data storage device 918 may include a machine-readable storage medium (or more specifically a computer-readable storage medium) 920 having one or more sets of instructions (e.g., the ID handler module 355) embodying any one or more of the methodologies of functions described herein. The ID handler module 355 may also reside, completely or at least partially, within main memory 904 and/or within processing device 902 during execution thereof by computer system 900; main memory 904 and processing device 902 also constituting machine-readable storage media. The ID handler module 355 may further be transmitted or received over a network 926 via network interface device 708.

Machine-readable storage medium 920 may also be used to store the device queue manager logic persistently. While machine-readable storage medium 920 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   scanning, by a processing device, source code for a first annotation associated with generating an identifier for a class;
   generating, using the first annotation, a first identifier value for the class;
   in response to the class not having a previously assigned identifier value, assigning the first identifier value to the class;
   in response to the class having a previously assigned identifier value:
     concatenating the first identifier value to the previously assigned identifier value to form a second identifier value, and
     assigning the second identifier value to the class;
   scanning, by the processing device, the source code for a second annotation associated with generating an identifier for a subclass of the class;
   generating, using the second annotation, a third identifier value for the subclass, wherein the third identifier value is different than the first identifier value and is different than the second identifier value;
   in response to the subclass not having a previously assigned identifier value, assigning the third identifier value to the subclass; and
   in response to the subclass having a previously assigned identifier value:
     concatenating the third identifier value to the previously assigned identifier value for the subclass, to form a fourth identifier value, and
     assigning the fourth identifier value to the subclass.

2. The method of claim 1, wherein the first identifier value is in view of a name of the class.

3. The method of claim 1, wherein the class is a Java™ class.

4. The method of claim 1, wherein the first annotation is a Java™ annotation associated with naming classes.

5. The method of claim 1, wherein the first annotation is operable to assign an element value associated with the name of the class.

6. The method of claim 1, wherein the class is associated with a visual component.

7. The method of claim 6, wherein the visual component is a custom visual component.

8. The method of claim 1, wherein the second identifier value comprises two strings separated by an underscore character.

9. The method of claim 1, wherein the concatenating to form the second identifier value and the assigning of the second identifier value generates additional code for compilation.

10. A computer system, comprising:
    a memory to store source code;
    a processing device, operatively coupled to the memory, the processing device to:
      scan the source code for a first annotation associated with generating an identifier for a class;
      generate, using the first annotation, a first identifier value for the class;

in response to the class not having a previously assigned identifier value, assign the first identifier value to the class;
in response to the class object having a previously assigned value:
concatenate the first identifier value to the previously assigned identifier value to form a second identifier value, and
assign the second identifier value to the class;
scan the source code for a second annotation associated with generating an identifier for a subclass of the class;
generate, using the second annotation, a third identifier value for the subclass, wherein the third identifier value is different than the first identifier value and is different than the second identifier value;
in response to the subclass not having a previously assigned identifier value, assign the third identifier value to the subclass; and
in response to the subclass having a previously assigned identifier value:
concatenate the third identifier value to the previously assigned identifier value for the subclass, to form a fourth identifier value, and
assign the fourth identifier value to the subclass.

11. The computer system of claim 10, wherein the first identifier value is in view of a name of the class.

12. A non-transitory computer-readable storage medium including instructions that, when accessed by a processing device, cause the processing device to:

scan, by the processing device, source code for a first annotation associated with generating an identifier for a class;
generate, using the first annotation, a first identifier value for the class;
in response to the class not having a previously assigned identifier value, assign the first identifier value to the class;
in response to the class having a previously assigned value:
concatenate the first identifier value to the previously assigned identifier value to form a second identifier value, and
assign the second identifier value to the class;
scan the source code for a second annotation associated with generating an identifier for a subclass of the class;
generate, using the second annotation, a third identifier value for the subclass, wherein the third identifier value is different than the first identifier value and is different than the second identifier value;
in response to the subclass not having a previously assigned identifier value, assign the third identifier value to the subclass; and
in response to the subclass having a previously assigned identifier value:
concatenate the third identifier value to the previously assigned identifier value for the subclass, to form a fourth identifier value, and
assign the fourth identifier value to the subclass.

13. The non-transitory computer-readable storage medium of claim 12, wherein the first identifier value is in view of a name of the class.

* * * * *